United States Patent
Rodriguez et al.

(10) Patent No.: US 8,351,588 B2
(45) Date of Patent: Jan. 8, 2013

(54) MULTI-WAY CALL CONNECTION MANAGEMENT SYSTEM

(75) Inventors: Herman Rodriguez, Austin, TX (US); Newton J. Smith, Jr., Austin, TX (US); Clifford J. Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 12/057,651

(22) Filed: Mar. 28, 2008

(65) Prior Publication Data
US 2008/0181384 A1 Jul. 31, 2008

Related U.S. Application Data

(63) Continuation of application No. 11/078,069, filed on Mar. 11, 2005, now abandoned.

(51) Int. Cl.
*H04M 3/42* (2006.01)
(52) U.S. Cl. .................................................. 379/202.01
(58) Field of Classification Search ................... 709/204, 709/227; 379/202.01, 211.02
See application file for complete search history.

(56) References Cited

U.S. PATENT DOCUMENTS

| | | | |
|---|---|---|---|
| 5,425,091 A | 6/1995 | Josephs | |
| 5,539,812 A | 7/1996 | Kitchin et al. | |
| 5,590,187 A | 12/1996 | Greenspan | |
| 5,745,558 A | 4/1998 | Richardson, Jr. et al. | |
| 5,883,945 A | 3/1999 | Richardson, Jr. et al. | |
| 6,163,692 A | 12/2000 | Chakrabarti et al. | |
| 6,545,995 B1 | 4/2003 | Kinnunen et al. | |
| 7,308,090 B2 | 12/2007 | White et al. | |
| 7,319,861 B2* | 1/2008 | Benco et al. | 455/414.1 |
| 7,336,776 B2 | 2/2008 | Barclay et al. | |
| 7,617,280 B1* | 11/2009 | Webster et al. | 709/204 |
| 2002/0159394 A1* | 10/2002 | Decker et al. | 370/252 |
| 2002/0188731 A1* | 12/2002 | Potekhin et al. | 709/227 |
| 2003/0014488 A1* | 1/2003 | Dalal et al. | 709/204 |
| 2003/0091181 A1 | 5/2003 | Martin | |
| 2003/0156697 A1 | 8/2003 | Svercek | |
| 2004/0125933 A1* | 7/2004 | Jun et al. | 379/202.01 |
| 2004/0174972 A1* | 9/2004 | Amano et al. | 379/202.01 |
| 2006/0177034 A1* | 8/2006 | Reding et al. | 379/211.02 |

FOREIGN PATENT DOCUMENTS

| | | |
|---|---|---|
| EP | 0604041 | 6/1994 |
| WO | WO01/31899 | 3/2001 |
| WO | WO2004/073288 | 8/2004 |

* cited by examiner

*Primary Examiner* — Yuwen Pan
*Assistant Examiner* — Sonia Gay
(74) *Attorney, Agent, or Firm* — Suiter Swantz pc llo (57) ABSTRACT

The present invention is directed to a multi-way connection management (MWCM) system for monitoring and maintaining call connections among a group of participating parties. The multi-way call connection may be established by connecting the originating party and the desired participating parties. Once a multi-way call connection is established, the multi-way call connection may be maintained until the originating party desires to terminate the call. Any disconnected party may rejoin the multi-way call by an automatic redial performed by the MWCM system. Additionally, the originating party may provide a call continuation period of the multi-way call when the originating party can rejoin the multi-way call. In this manner, other participating parties may stay in the multi-way call during the provided period without the originating party being connected. Advantageously, the originating party may save the time and effort of repeating a tedious process (by calling all other participating parties) to establish a multi-way call.

17 Claims, 6 Drawing Sheets

MULTI-WAY CALL CONNECTION MANAGEMENT SYSTEM

CROSS REFERENCE TO RELATED APPLICATIONS

The present application is a continuation of U.S. application Ser. No. 11/078,069 filed Mar. 11, 2005. Said U.S. application Ser. No. 11/078,069 is hereby incorporated by reference in its entirety.

FIELD OF THE INVENTION

The present invention generally relates to the field of computer software, and particularly to an information management system for multi-way connection management.

BACKGROUND OF THE INVENTION

Today's modern telephone systems provide individuals and businesses with a variety of customized calling package plans and services. Many features such as call waiting, call-forwarding, three-way calling and the like have been provided. The three-way call has been utilized when a user needs to simultaneously communicate with more than one party. Conventionally, a three-way call may be initiated by a call originating party calling two other parties to participate in the three-way call. For instance, a three-way call is made through the call originating party calling a second attending party, pressing a flash button (or depressing a switch hook) on a telephone, then calling a third attending party, and pressing a flash button or a connect button. At this point, the three-way call has been established and the three parties can converse with each other. The three-way call may be interrupted when one party's line drops, which happens frequently when using a wireless phone. Then the originating party must go through the connection process again. When the call originating party's line drops, all three parties lose the connection and the call originator must initiate a new three-way call by executing the above-described tedious process.

Therefore, it would be desirable to provide a call connection management system which overcomes the above described problems of a three-way call. Further, it would be desirable if the call connection management system could manage multi-way calls among many participating parties.

SUMMARY OF THE INVENTION

Accordingly, the present invention provides a multi-way call management system for managing, maintaining and re-establishing a multi-way call connection originating from a first user to a plurality of users.

In a first aspect of the present invention, a method of monitoring and managing a multi-way call connection is provided. A request for a multi-way telephone call may be originated by a first user. The request may include phone numbers of other participating parties. A list including phone numbers of the first user and other participating parties may be generated and stored in a database. The multi-way call connection may be established by connecting the first user and other participating parties. The established multi-way call connection may be monitored for any line disconnection. When any disconnected line is detected, a telephone number for the disconnected line is retrieved from the list. Then, whether the participating party at the line desires to stay in the multi-way call may be determined, for example by noting whether the line dropped or the participant hung up. If the participating party desires to stay in the multi-way call, the line may be reconnected automatically by redialing the participant for a specified reconnection interval. Thus, if the participant desires to rejoin the call after a line drop, the participant should hang up so the call can be received. If the participating party desires to terminate the connection, the participating party information may be removed from the list. The multi-way call may be maintained until the first user requests to terminate the multi-way call. Upon the termination of the multi-way call, the list storing the request associated with the multi-way call may be removed from the database.

In a second aspect of the present invention, a telephone call management system capable of maintaining a multi-way call connection is provided. The telephone call management system may comprise a phone service module configured to establish a telephone call connection including a multi-way call connection among a plurality of users. A multi-way call connection management module coupled to the phone service module is also provided as a part of the telephone call management system. The multi-way call connection management module may be configured for monitoring the multi-way call connection and detecting a line disconnection. A first user who originates the multi-way call connection to a plurality of participating users may provide a telephone number of each of the plurality of participating users. Then, the multi-way call may be established and a multi-way call list associated with the multi-way call may be created in a database. The multi-way call list may include connection status information, a telephone number and hang-up information for each user. The database storing the multi-way call list may be communicatively coupled to the phone service module and the multi-way call connection management module. After the multi-way call has been established by the phone service module, the multi-way call connection management module may monitor the multi-way call for any line disconnection among the plurality of users. Whenever a line disconnection is detected, the nature of the disconnection may be determined. The multi-way call list may be updated accordingly. The multi-way call connection management module may work through the multi-way call list and re-establish a connection between the first user and the participating party of the disconnected line if there has been a line drop or the like. The multi-way call connection management module may remove the participating user from the multi-way call list if the participating user desires to terminate the call. When the first user desires to terminate the multi-way call, the multi-way call list associated with the multi-way call may be removed from the database. The phone service module may terminate the multi-way call by disconnecting the first user and the plurality of participating users.

In an advantageous aspect of the present invention, the established multi-way call may be maintained even if the first user (originating party) has been disconnected as long as the originating party does not desire to terminate the multi-way call. The originating party may be rejoined into the multi-way call by the automatic redial performed by the present invention. Alternatively, the originating party may enter a predetermined touch tone pattern to rejoin the multi-way call. Additionally, the originating party may provide a call continuation period of the multi-way call when the originating party can rejoin the multi-way call. Thus, other participating users may continue their conversation during the call continuation period.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown.

A call management system capable to monitor and maintain a multi-way call is provided. In the following description, numerous specific descriptions are set fourth in order to provide a thorough understanding of the present invention. It should be appreciated by those skilled in the art that the present invention may be practiced without some or all of these specific details. In some instances, well known process operations have not been described in detail in order not to obscure the present invention.

The present invention is directed to a multi-way connection management (MWCM) system for monitoring and maintaining a call connection among a group of participating parties. The MWCM system may be configured to monitor and manage a conventional three-way call of three participating parties. In addition, the MWCM system may be configured to monitor and manage a multi-way call of more than three participating parties. A multi-way call may be initiated by an originating party. The originating party may provide telephone numbers of desired participating parties. The multi-way call connection may be established by connecting the originating party and the desired participating parties. Once a multi-way call connection is established, the multi-way call connection may be maintained until the originating party desires to terminate the call. The originating party may leave and rejoin the multi-way call by the automatic redial process (to be described later) performed by the MWCM system. Alternatively, the originating party may enter a predefined touch tone pattern to re-establish a connection to the multi-way call. Additionally, the originating party may provide a call continuation period of the multi-way call when the originating party can rejoin the multi-way call. In this manner, other participating parties may stay in the multi-way call during the provided period without the originating party connected. Advantageously, the originating party may save time and effort to repeat a tedious process (by calling all other participating parties) to establish a new multi-way call.

Figure 1:
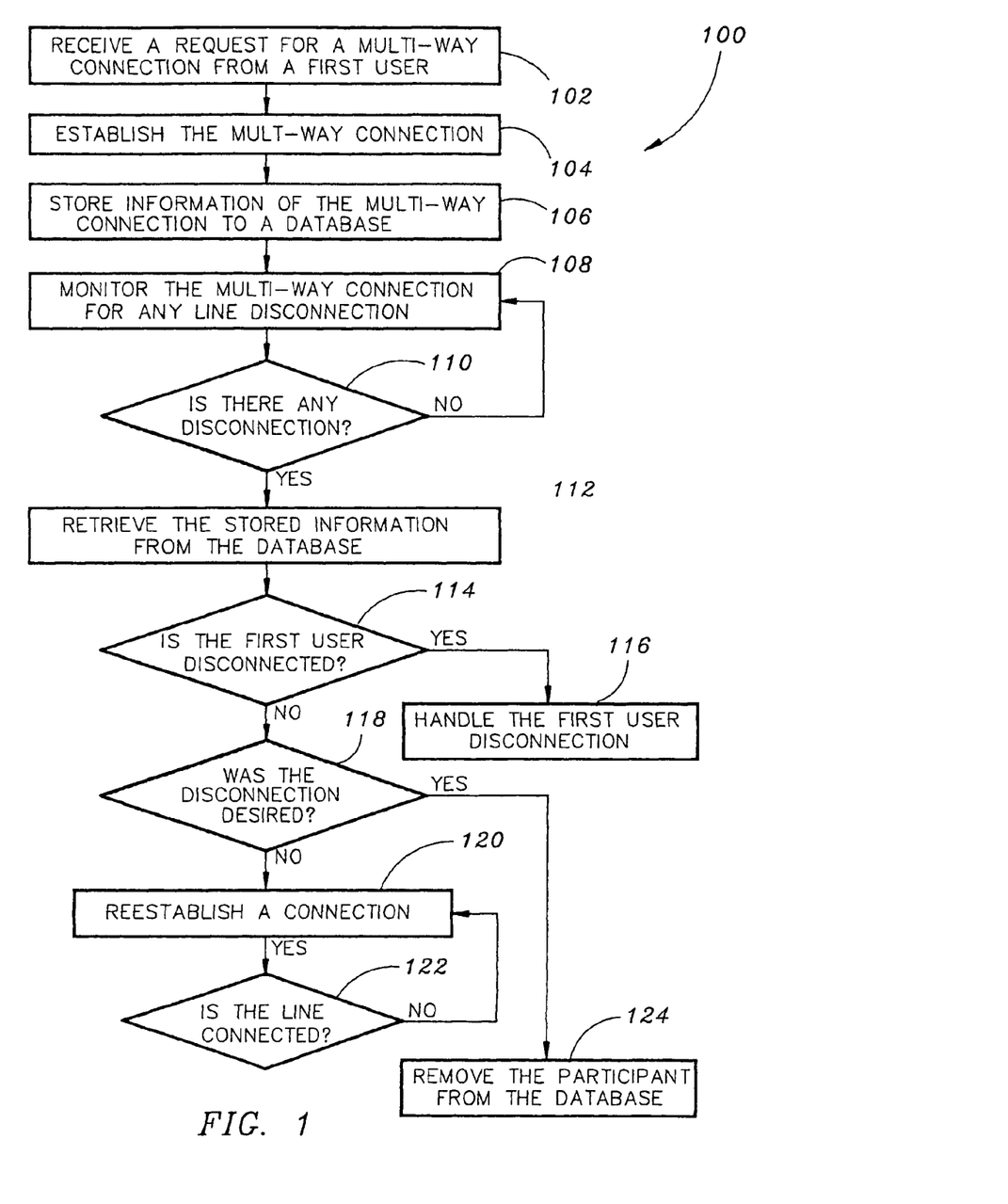
FIG. 1 is a flow diagram illustrating a method implemented by a multi-way call connection management system in accordance with an exemplary embodiment of the present invention.

Referring now to FIG. 1, a flow diagram 100 illustrating a method implemented by a multi-way call connection management system in accordance with the present invention is shown. The method begins in step 102 in which a request for a multi-way call is received from a first user (an originating party). The request may include telephone numbers of other participating parties. The multi-way call may be established through a conventional telephone service system in step 104. The conventional telephone service system may include a wireless telephone service, a cellular phone service, a land line telephone service, a Voice over IP (VoIP) telephone service, or the like. One of skill in the art will appreciate that establishing a multi-way connection by a conventional telephone service system is known to the art. An example of the multi-way call may include a three-way call. In a particular embodiment, a three-way call is made through the call originating party calling a second attending party, pressing a flash button (or depressing a switch hook) on a telephone device, then calling a third attending party, and pressing a flash button or a connect button. The flash button (flash key) may be provided on a conventional telephone device to provide a multi-way call.

The multi-way call connection may be established by connecting the first user and other participating parties based on the request in step 104. Next, in step 106, the request information of the multi-way call may be created and stored to a database. An exemplary database utilized by the present invention will be described in detail later.

The established multi-way call may be monitored for any disconnected line in step 108. If there is any line disconnection detected in step 110, the stored request information will be retrieved in step 112. In step 114, the MWCM system may check whether the first user is disconnected upon detection of a disconnected line. If the first user is disconnected, the MWCM system may proceed to first user disconnection handling steps in step 116, as described in FIG. 2. If a participating party is disconnected (if the result of the determination step 114 is No), the MWCM system may check whether the disconnection was desired in step 118. For example, if the disconnection is a result of a hang up or the like, the MWCM may assume that the participating party desires to terminate the communication. If the disconnection was desired (if the result of the determination step 118 is Yes), the participating party at the disconnected line will be removed from the list associated with the multi-way call in step 124. If the disconnection was not desired (if the result of the determination step 118 is No), the MWCM system may perform an automatic redial to reconnect the participating party to the multi-way call connection in step 120. The MWCM system may repeat the automatic redial in step 120 until the MWCM system may determine that the line is successfully reconnected in step 122, or a reconnection time-out occurs.

Figure 2:
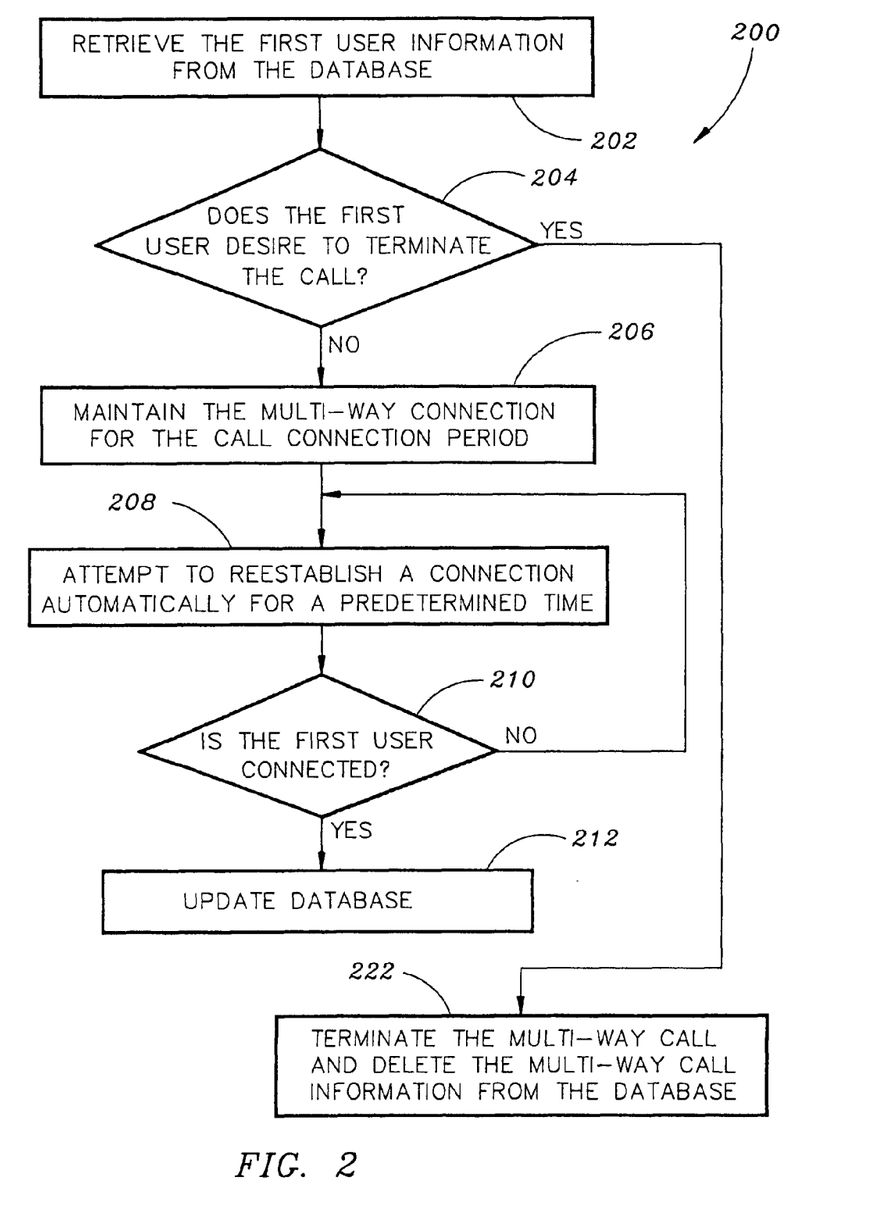
FIG. 2 is a flow diagram illustrating steps implemented by the multi-way call connection management system in FIG. 1 wherein an originating party loses a line.

If the first user is disconnected, the management system may maintain the multi-way connection as long as the first user desires the multi-way call to be continued (i.e. for the call continuation period). Referring now to FIG. 2, a flow diagram 200 illustrating steps implemented by the multi-way call connection system when the first user is disconnected. In a particular embodiment of the present invention, when a disconnected line is detected, a database element associated with the disconnected line may be updated to store the information of the disconnection. Further, if the line is reconnected, the database element may be updated to store the information of the reconnection. In this manner, the management system may continue to attempt to re-establish disconnected lines for each multi-way call connection. In step 202, the information associated with the first user may be retrieved from the database. Then, in step 204, based on the hang-up information of the first user, the MWCM system may determine whether the first user has desired to terminate the multi-way call. The first user may terminate the call by a method provided by a conventional telephone service system. The method may include pressing a hang-up button, performing an "off hook", or the like. It should be appreciated that there are various ways to perform a hang up through a particular telephone device. It should be also appreciated that detecting a hang-up from the telephone device is known to the art. Alternatively, the first user may enter a predefined touch tone combination (e.g. "*89" or the like) to terminate the multi-way call.

If the first user has desired to terminate the multi-way call connection, the management system may disconnect all participating users in the multi-way call and remove database elements associated with the participating users in step 222. If the first user has not desired to terminate the multi-way call connection, the management system may maintain the multi-way call connection in step 206 and perform an automatic redial to connect the first user to the multi-way call in step 208. Steps 208 and 210 may be repeated until the first user rejoins the multi-way call connection or a reconnection time-out occurs.

In a particular embodiment of the present invention, the multi-way connection may be maintained for a call continuation period even after the first user has disconnected from the multi-way call. A default call continuation period may be set up by the MWCM system. Alternatively, a user defined call continuation period may be provided by the first user. For example, the MWCM system may include a default period for 30 minutes. The multi-way call connection may be maintained for the period of 30 minutes even after the first user is disconnected. The management system may perform an automatic redial in order to reconnect the first user. If the first user is not reconnected during the call continuation time, the multi-way call connection may be terminated. During the call connection period, the first user may enter back into the multi-way call though utilizing a predefined touch tone pattern. For example, when the first user presses "*69" on the telephone device, the MWCM system may reconnect the first user to the multi-way call originated by the first user.

In a particular embodiment of the present invention, the first user may utilize a predefined touch tone code to specify to the MWCM system the call continuation time. For example, the first user may enter "*9960#" to have the multi-way call maintained for an additional 60 minutes after the first user is disconnected from the multi-way call by performing a hang-up or the like.

Thus, there are two time intervals of interest in the present invention:

The reconnection interval—this is the user-selectable period of time during which the MWCM system will attempt to reconnect a participant whose line has been dropped. After this time interval has passed, the system will no longer attempt to redial the participant. During this time interval, the system may redial continuously, may redial every x minutes, or in some other pattern, selectable by the user.

The call continuation interval—this is the user-selectable period of time during which the multi-way call will continue after the first caller has disconnected from the call, either intentionally by hanging up, or unintentionally by a dropped line. During this time interval, the system will attempt to reconnect the first user for the reconnection interval. During this time, the first user can also rejoin the call by entering a predefined request pattern. If the first user never rejoins the call, then the multi-way call will be terminated at the end of the call continuation period.

Figure 3:
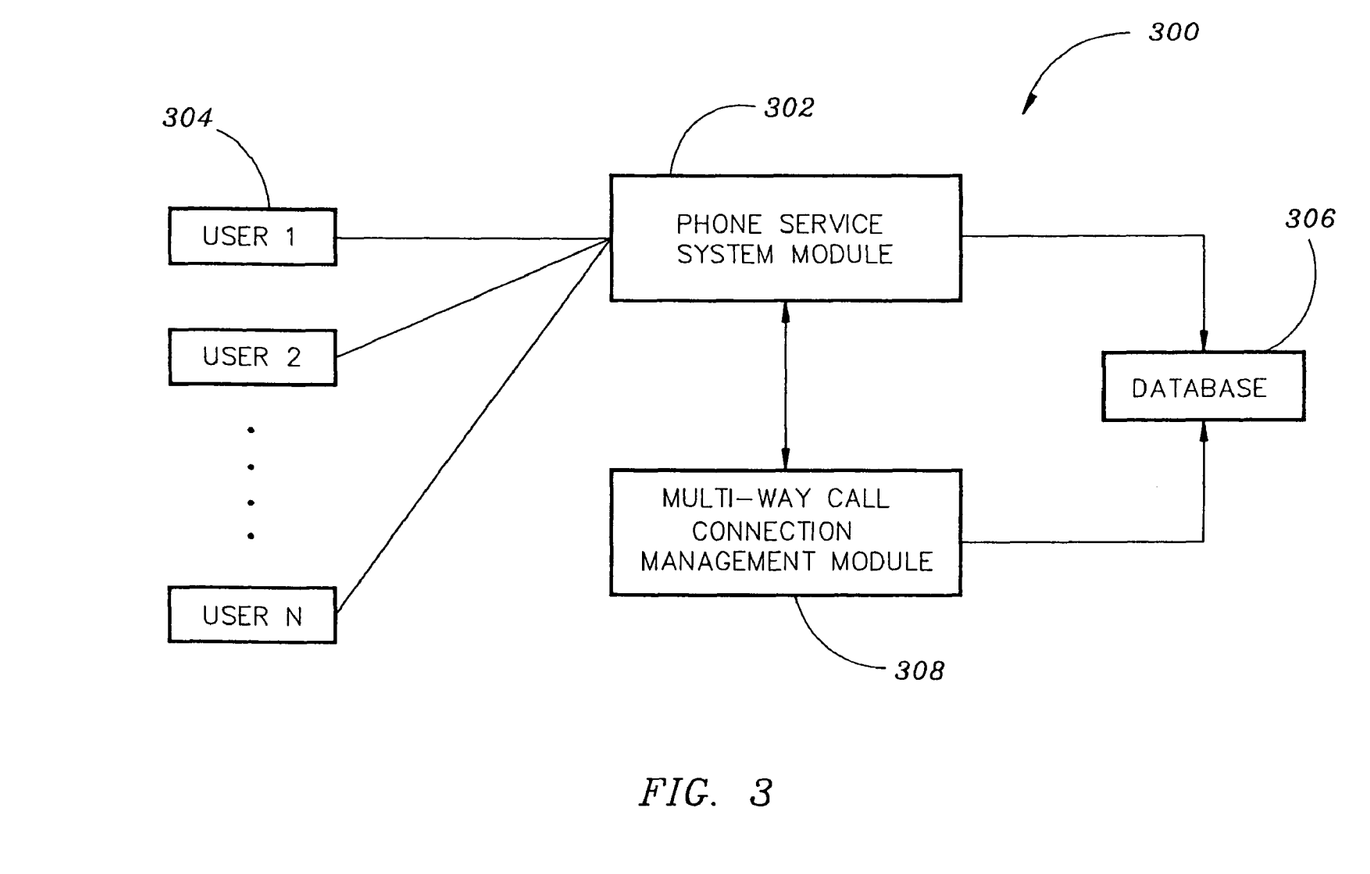
FIG. 3 is a block diagram of an exemplary system capable to implement the method illustrated in FIG. 1 in accordance with the present invention.

Referring to FIG. 3, a block diagram 300 of an exemplary MWCM system capable to implement the method described in FIG. 1 is shown. The MWCM system may comprise a phone service system module 302 capable to provide conventional phone services including a three-way call, a multi-way call of many participating parties, and the like. For purposes of simplicity, the phone service system module is described with reference to widely available systems and standards, including a wireless phone service system, a land line phone service system, a private branch exchange (PBX) service system, a Voice over IP (VoIP) telephone service, or the like. It should also be appreciated that the particular components of the phone service system may be implemented in accordance with a variety of conventions, standards, or technologies and still provide a suitable environment for implementation of the underlying concepts of the present invention.

The MWCM system may comprise a multi-way call management module 308 coupled to the phone service module 302. Each user station 304 may place a call through a phone service system module 302. The phone service module 302 may be configured to establish a multi-way call providing communication paths among the user stations 304. The multi-way call management module 308 is configured to monitor and manage an established multi-way call. The multi-way call management module 308 may manipulate a multi-way call request database 306 communicatively coupled to the multi-way call management module 308. The database 306 may store information of established multi-way call connections. One skilled in the art would appreciate that there are various ways to design a database for storing such information.

Figure 4A:
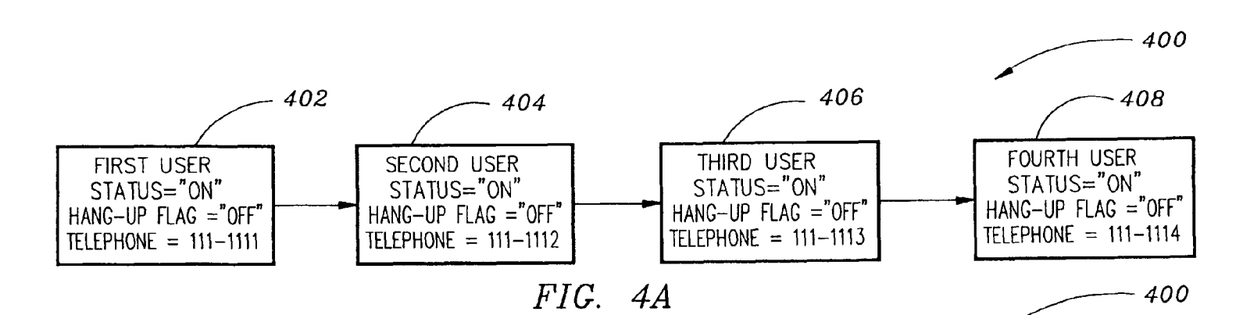
FIGS. 4A-C depicts a multi-way call list utilized in the method implemented by the multi-way call connection system in FIG. 1.

Referring now to FIG. 4A, a multi-way call list 400 utilized as an element of the database 306 is shown. The multi-way call list 400 may be created after the phone service module establishes a multi-way call connection among a first user, a second user, a third user and a fourth user. The multi-way call list may include user records 402, 404, 406 and 408 each of which comprises a status field, a hang-up flag, a telephone number or the like. For example, a user record 402 includes a status field set to be "On" indicating the first user is connected to the multi-way call, a hang-up flag set to be "Off" initially, a telephone number of the first user and the like. The multi-way call list 400 may be updated when there is a line disconnection.

Figures 4B, 4C:
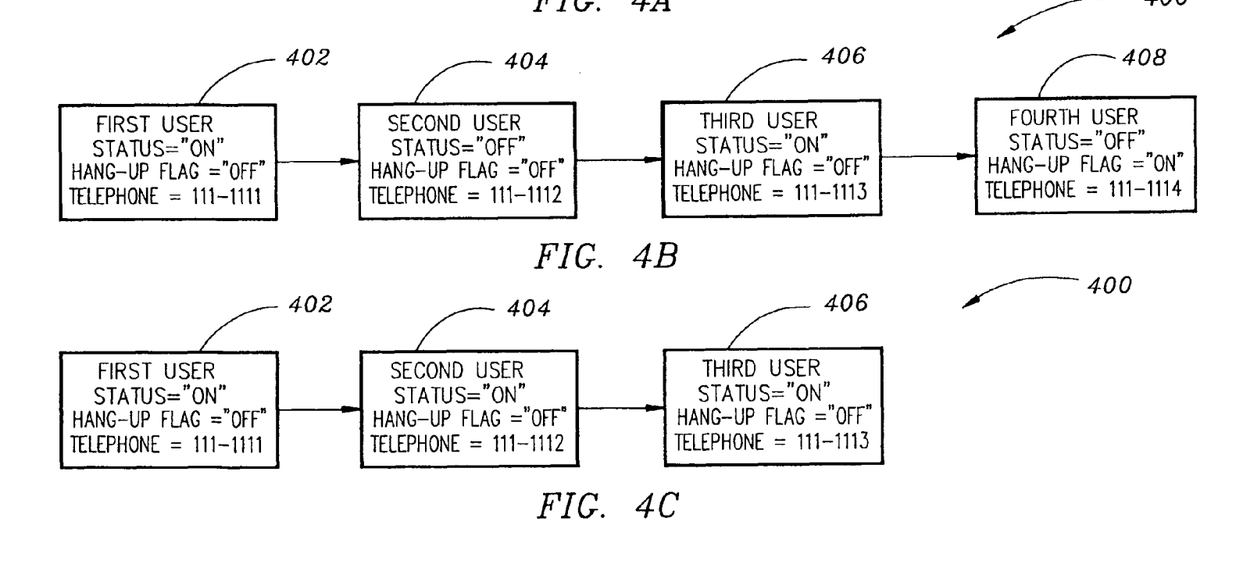

Referring now to FIG. 4B, the updated multi-way call list 400 after two participating parties are disconnected is shown. A telephone line may be disconnected by a line drop, a hang-up, or the like. When the second user line has dropped, the status field of the user record 404 is marked to be "Off" indicating the second user line disconnected and the hang-up flag is remained to be "Off" indicating the disconnection has not been desired by the second user. When the fourth user line is terminated by the fourth user, the status field of the user record 408 is marked to be "Off" indicating the user line disconnected and the hang-up flag is marked to be "On" indicating the disconnection has been desired by the fourth user. The management module may attempt to reconnect the second user to the multi-way call. In FIG. 4C, the updated multi-way call list 400 when the second user rejoins the multi-way call connection is shown. The status field of the user record 404 is marked to be "On" indicating the second user line is reconnected. The management module may remove the user record 408 from the multi-way call list. As a result, the multi-way call list 400 may include the user records 402, 404 and 406, but not 408. The fourth user may not be able to rejoin the multi-way call unless the first user requests the fourth user to join the multi-way call again.

Figure 5:
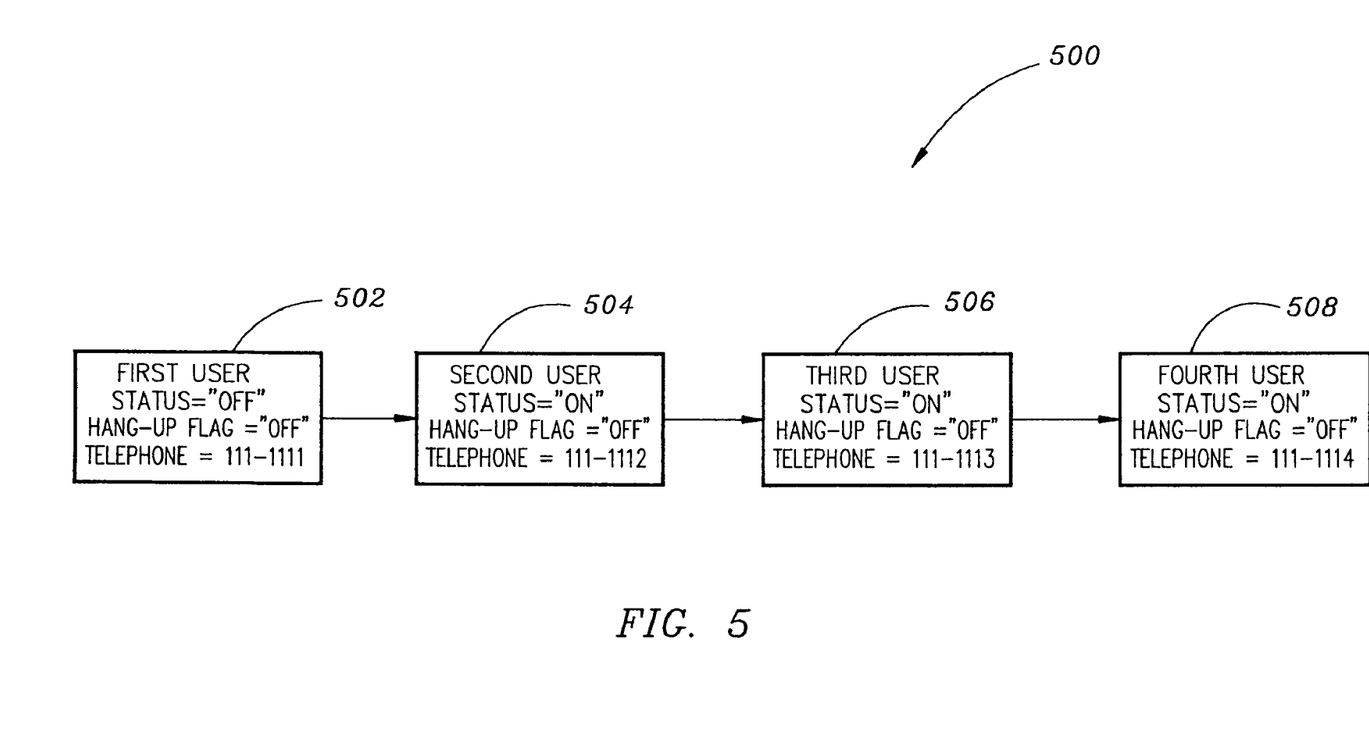
FIG. 5 is a depiction of the multi-way call list utilized in the steps implemented in FIG. 2.

Referring now to FIG. 5, a multi-way call list 500 is depicted when the first user is disconnected. Upon a detection of any line disconnection, a status field of the disconnected line in the multi-way call list 500 may be updated. For example, a first user record 502 is updated to have a status field to be marked "Off" when the first user line drops. A hang-up flag may remain to be "Off" if the first user did not desire to terminate the call. The management module may maintain the multi-way call allowing the second user, the third user and the fourth user stay in the call while the management module performs an automatic redial to connect the first user. When the first user rejoins the call, the status field of the user record 502 may be updated to be "On".

The hang-up flag may be marked to be "On" if the first user desires to disconnect from the call. The management module may retrieve a default call continuation period of the multi-way call. If the first user provides a user specific period for the multi-way call, the management module may maintain the call for the user specific period. Otherwise, the management module may maintain the call for the system default period. Then, the multi-way call may be terminated for all participating parties. If the multi-way call is to be terminated when the first user is disconnected, then the call continuation period is set to zero. When the call is terminated, the multi-way call list associated with the multi-way call may be removed from the database.

Figure 6:
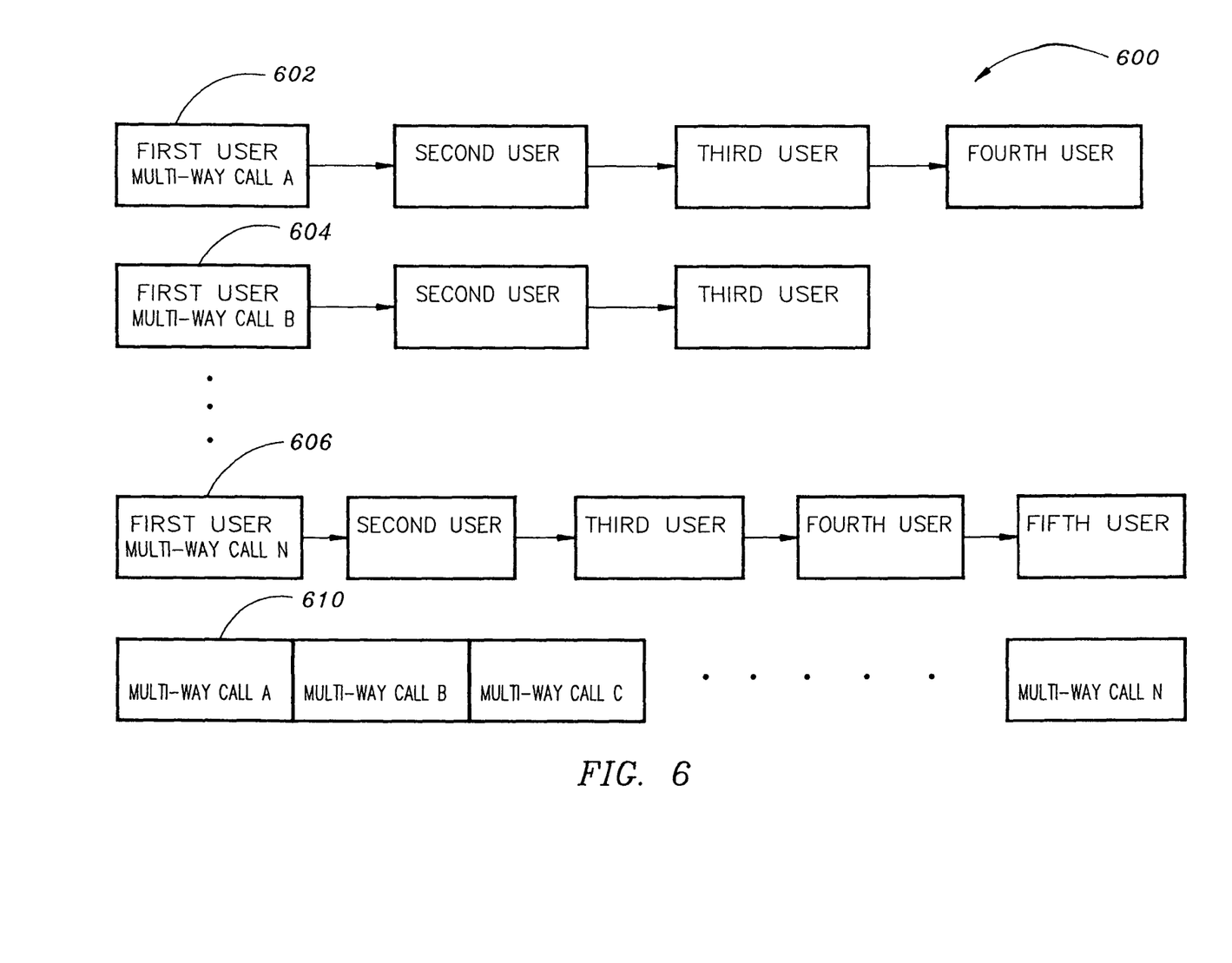
FIG. 6 is a depiction of a table including a plurality of multi-way call lists utilized by the multi-way call connection management system in accordance with an exemplary embodiment of the present invention.

Referring now to FIG. 6, an exemplary database 600 including a plurality of multi-way call lists is shown. Multi-way call lists 602, 604 and 606 associated with several multi-way calls may be created when the multi-way calls are established. The database 600 may be manipulated by the multi-way call management module to monitor and manage information of multi-way calls in accordance with the present invention. In a particular embodiment of the present invention, the database 600 may maintain an originating party list 610 of each multi-way call separately. The originating party list 610 may store user specific reconnection time-out and call continuation periods for each originating party, system default periods, or the like.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the multi-way connection management system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described is merely an explanatory embodiment thereof. It is the intention of the following claims to encompass and include such changes.

What is claimed is:

1. A method of monitoring and managing a multi-way telephone call connection comprising:
   receiving a request for a multi-way telephone call from a first user, the request including at least a phone number of a second user and a phone number of a third user;
   establishing the multi-way telephone call based on the request, the established multi-way telephone call connecting the first user, the second user and the third user;
   creating a multi-way call list including connection status information, a telephone number and hang-up information of the first user, the second user, and the third user, the multi-way call list being associated with the multi-way telephone call;
   storing the multi-way call list in a database;
   monitoring the multi-way telephone call for a line disconnection;
   re-establishing the multi-way telephone call when an unintentional line disconnection is detected, wherein re-establishing the multi-way telephone call when an unintentional line disconnection is detected includes receiving a re-connection request from the first user during an automatic redial process, the automatic redial process being initiated upon a detection of an unintentional line disconnection, the automatic redial process configured to redial the first user;
   receiving a call continuation period of the multi-way telephone call from the first user;
   receiving a reconnection interval and a redial pattern from the first user, the reconnection interval being a period of time during which attempts to re-connect the first user are to be made, the redial pattern establishing a dialing pattern via which attempts to reconnect the first user are to be made during said reconnection interval;
   when the second user and third user are connected via the multi-way telephone call, and when the first user does not rejoin the multi-way telephone call during the call continuation period, terminating the multi-way telephone call; and
   removing the multi-way call list from the database upon terminating the multi-way telephone call.

2. The method as described in claim 1, further comprising:
   terminating the multi-way telephone call if the first user requests to hang-up,
   wherein the multi-way telephone call is maintained until a request to terminate is received from the first user.

3. The method as described in claim 1, the monitoring the multi-way telephone call step further comprising:
   updating the multi-way call list upon a detection of the line disconnection, the list being associated with the multi-way telephone call.

4. The method as described in claim 1, the re-establishing step further comprising:
   checking whether the line disconnection is caused by a line drop or a hang-up;
   reconnecting the disconnected line if the disconnection is caused by the line drop; and
   removing the telephone number from the multi-way call list if the disconnection is caused by a hang-up.

5. The method as described in claim 4, wherein the hang-up is a received predefined touch tone pattern.

6. The method as described in claim 4, further comprising:
   terminating the multi-way telephone call if the telephone numbers of the at least second user and the third user have been removed from the multi-way call list.

7. The method as described in claim 1, wherein the request for a multi-way telephone call includes a plurality of phone numbers to which the first user desires to establish the multi-way telephone call.

8. A telephone call management system capable to manage a multi-way call connection, comprising:
  a phone service module configured for establishing and terminating a telephone call connection, the telephone call connection including the multi-way call connection among a plurality of users;
  a multi-way call connection management module communicatively coupled to the phone service module, the multi-way call connection management module configured for monitoring the multi-way call connection and detecting a disconnected line in the multi-way call connection; and
  a database communicatively coupled to the phone service module and the multi-way call connection management module, the database including a plurality of multi-way call lists manipulated by the multi-way call connection management module,
  wherein a first user originates the multi-way call connection to the plurality of users and provides a telephone number of each of the plurality of users to the multi-way call connection management module which creates the multi-way call list associated with the multi-way call connection when the phone service module establishes the multi-way call connection,
  wherein the multi-way call connection management module is configured to request an automatic redial process to the phone service system upon a detection of a disconnected line, the automatic redial process being performed as dictated by a reconnection interval provided by the first user and in accordance with a redial pattern provided by the first user, and
  wherein the multi-way call connection management module is further configured to terminate the multi-way call connection after a call continuation period expires and remove the multi-way call list from the database when only the first user becomes disconnected from the multi-way call connection to the plurality of users and when the first user does not rejoin the multi-way call connection during the call continuation period, the call continuation period being either a default time period or a time period defined by the first user and provided to the multi-way call connection management module by the first user.

9. The telephone call management system as described in claim 8, wherein the phone service module provides a wireless phone service.

10. The telephone call management system as described in claim 8, wherein the phone service module provides a land line phone service.

11. The telephone call management system as described in claim 8, wherein the phone service module provides a Voice over IP (VoIP) service.

12. The telephone call management system as described in claim 8, wherein the multi-way call list includes connection status information, a telephone number and hang-up information for each of the plurality of users.

13. A non-transitory computer readable medium containing program instructions which when executed by a processor cause said processor to perform steps for monitoring and managing a multi-way telephone call connection, the steps comprising:
  receiving a request for a multi-way telephone call from a first user, the request including phone numbers of a plurality of participating users;
  establishing the multi-way telephone call based on the request, the established multi-way telephone call connecting the first user and each of the plurality of participating users;
  creating a multi-way call list including connection status information, a telephone number and hang-up information of the first user and each of the plurality of participating users, the multi-way call list being associated with the multi-way telephone call;
  monitoring the multi-way telephone call for any disconnected line;
  performing an automatic redial process by re-establishing a connection to the multi-way telephone call upon a detection of the disconnected line,
  wherein the line is disconnected unintentionally, said automatic redial process being performed during a reconnection interval provided by the first user, said automatic redial process being performed in accordance with a redial pattern provided by the first user;
  terminating the multi-way telephone call if the first user desires to terminate;
  removing the multi-way call list associated with the terminated multi-way telephone call; and
  when the first user is disconnected from the multi-way telephone call, a second user and third user included in the plurality of users are connected via the multi-way telephone call, and when the first user does not rejoin the multi-way telephone call during a call continuation period defined by the first user, automatically terminating the multi-way telephone call after expiration of the call continuation period,
  wherein the plurality of participating users remain in the multi-way call telephone call until the first user desires to terminate the multi-way telephone call.

14. The non-transitory computer readable medium as described in claim 13, wherein the hang-up information indicates whether the line disconnection is desired.

15. The non-transitory computer readable medium as described in claim 13, further comprising:
  updating the multi-way call list upon a detection of the disconnected line, wherein the connection status and the hang-up information of the disconnected line are updated.

16. The non-transitory computer readable medium as described in claim 13, further comprising:
  receiving a call continuation period of the multi-way telephone call from the first user; and
  terminating the multi-way telephone call after the period if the first user can not rejoin the multi-way telephone call.

17. The non-transitory computer readable medium as described in claim 13, further comprising:
  receiving a re-connection request from the first user during an automatic redial process wherein the received re-connection request from the first user is a predefined touch tone pattern.

* * * * *